United States Patent
Tsuru et al.

(10) Patent No.: US 7,291,659 B2
(45) Date of Patent: Nov. 6, 2007

(54) WATER-BASED INKS FOR INK-JET PRINTING

(75) Inventors: Isao Tsuru, Wakayama (JP); Ryuma Mizushima, Wakayama (JP); Katsuhiko Inada, Osaka (JP); Takehiro Tsutsumi, Osaka (JP)

(73) Assignee: KAO Corporation, Tokyo (JP)

( * ) Notice: Subject to any disclaimer, the term of this patent is extended or adjusted under 35 U.S.C. 154(b) by 77 days.

(21) Appl. No.: 11/190,857

(22) Filed: Jul. 28, 2005

(65) Prior Publication Data

US 2006/0030640 A1    Feb. 9, 2006

(30) Foreign Application Priority Data

Aug. 6, 2004 (JP) ............................. 2004-231227
Nov. 2, 2004 (JP) ............................. 2004-318686

(51) Int. Cl.
*C09D 11/00* (2006.01)

(52) U.S. Cl. ..................................... 523/160; 523/161
(58) Field of Classification Search ................ 523/160, 523/161
See application file for complete search history.

(56) References Cited

U.S. PATENT DOCUMENTS

| | | | |
|---|---|---|---|
| 6,117,921 A * | 9/2000 | Ma et al. | 523/161 |
| 6,406,143 B1 | 6/2002 | Chen et al. | |
| 6,749,290 B2 * | 6/2004 | Takada et al. | 347/65 |
| 6,762,217 B2 * | 7/2004 | Wakabayashi et al. | 523/160 |
| 6,933,330 B2 * | 8/2005 | Hidaka et al. | 523/160 |
| 2003/0144378 A1 * | 7/2003 | Mizushima et al. | 523/160 |
| 2005/0282932 A1 * | 12/2005 | Takizawa et al. | 523/160 |
| 2006/0052480 A1 | 3/2006 | Mizushima et al. | |

FOREIGN PATENT DOCUMENTS

| | | |
|---|---|---|
| JP | 10-87768 | 4/1998 |
| JP | 2002-88285 | 3/2002 |
| JP | 2004-217916 | 8/2004 |
| WO | WO 00/39226 | 7/2000 |

* cited by examiner

*Primary Examiner*—Edward J. Cain
(74) *Attorney, Agent, or Firm*—Oblon, Spivak, McClelland, Maier & Neustadt, P.C.

(57) ABSTRACT

There are provided a water dispersion for ink-jet printing comprising colorant-containing water-insoluble graft polymer particles in which the water-insoluble graft polymer contains a main chain which is a polymer chain containing a constitutional unit derived from a salt-forming group-containing monomer (a) and a constitutional unit derived from an aromatic ring-containing (meth)acrylate monomer (b), and a side chain which is a polymer chain containing a constitutional unit derived from a hydrophobic monomer (c); a water-based ink for ink-jet printing using the water dispersion; and an ink-jet printing method using the water-based ink. In accordance with the present invention, printed images or characters formed on a coated paper are excellent in gloss, image clarity and image clarity property including both of the image clarity and the gloss, and printed images or characters formed on an ordinary paper exhibit a high print density.

7 Claims, No Drawings

WATER-BASED INKS FOR INK-JET PRINTING

FIELD OF THE INVENTION

The present invention relates to water dispersions for ink-jet printing, water-based inks for ink-jet printing containing the water dispersions and recording method using the water-based inks.

BACKGROUND OF THE INVENTION

In ink-jet printing methods, droplets of ink are directly projected onto a recording medium from very fine nozzles and allowed to adhere to the recording medium, to form characters and image. The ink-jet printing methods have been rapidly spread because of their various advantages such as easiness of full coloration, low costs, capability of using ordinary paper as the recording medium, non-contact with printed images and characters, etc.

Among such printing methods, in view of enhancing the weather resistance and water resistance of printed images and characters, an ink-jet printing method utilizing an ink containing a pigment as the colorant has now come to dominate. For example, PCT pamphlet WO 00/39226 discloses a water-based ink containing a pigment-containing vinyl polymer in which a graft polymer obtained from a macromer is used as the vinyl polymer to achieve a high print density.

Also, in JP 10-87768A, there is disclosed a water dispersion containing an insoluble colorant and a graft copolymer dispersant having a main chain and at least one side chain in which both the chains are respectively produced from an ethylenically unsaturated monomer, and one of the main chain and side chain constitutes a hydrophilic moiety and the other constitutes a hydrophobic moiety containing at least one monomer selected from the group consisting of aryl esters of acrylic acid, aryl esters of methacrylic acid, N-aryl acrylamides, N-acryl methacrylamides and vinyl aryl esters in an amount of 50% by weight or more based on the total weight of the hydrophobic moiety.

Although these conventional water-based inks are excellent in print density and dispersion stability, there is still such a need that the water-based inks are further improved in print density upon printing on ordinary papers as well as gloss upon printing on coated papers for ink-jet printing (hereinafter referred to merely a "coated papers").

SUMMARY OF THE INVENTION

The present invention provides water dispersions for ink-jet printing comprising colorant-containing water-insoluble graft polymer particles in which the water-insoluble graft polymer has the following main chain and side chain:

Main chain: Polymer chain containing a constitutional unit derived from a salt-forming group-containing monomer (a) and a constitutional unit derived from an aromatic ring-containing (meth)acrylate monomer (b); and Side chain: Polymer chain containing a constitutional unit derived from a hydrophobic monomer (c), as well as water-based inks for ink-jet printing which contain the water dispersions, and an ink-jet printing method comprising the step of forming printed characters or images with the water-based inks on a void-type glossy recording medium having an ink accepting layer using an ink-jet printer.

DETAILED DESCRIPTION OF THE INVENTION

The present invention is directed to a water-based ink for ink-jet printing which is excellent in gloss, image clarity and image clarity property including both of the image clarity and the gloss upon printing on a coated paper, and exhibits a high print density upon printing on an ordinary paper.

(Water-Insoluble Graft Polymer)

The water-insoluble graft polymer used in the present invention contains a main chain which is a polymer chain containing a constitutional unit derived from a salt-forming group-containing monomer (a) and a constitutional unit derived from an aromatic ring-containing (meth)acrylate monomer (b), and a side chain which is a polymer chain containing a constitutional unit derived from a hydrophobic monomer (c), and may further contain side chains containing other constitutional units. The water-insoluble graft polymer is preferably a vinyl polymer in view of enhancing a dispersion stability of the resultant water dispersion.

In the water dispersion of the present invention, it is considered that since the main chain of the water-insoluble graft polymer contains the constitutional unit derived from the salt-forming group-containing monomer (a) and the constitutional unit derived from the aromatic ring-containing (meth)acrylate monomer (b), the salt-forming group is enhanced in mobility. As a result, when the water dispersion of the colorant-containing water-insoluble graft polymer is injected onto a glossy paper as the coated paper from ink-jet nozzles, the printed surface of the paper is enhanced in smoothness owing to less agglomeration of the salt-forming group, and the resultant prints can also be enhanced in gloss and rubbing resistance.

The constitutional unit derived from the salt-forming group-containing monomer (a) which is contained in the main chain is preferably produced by polymerizing the salt-forming group-containing monomer. After completion of the polymerization, salt-forming groups such as anionic groups and cationic groups may be introduced into the resultant polymer chain.

The constitutional unit derived from the salt-forming group-containing monomer (a) serves for enhancing a dispersion stability of the polymer. Examples of the salt-forming group include anionic groups such as carboxyl group, sulfonic group and phosphoric group, and cationic groups such as amino group and ammonium group.

Examples of the preferred salt-forming group-containing monomer contained in the constitutional unit derived from the salt-forming group-containing monomer (a) include anionic monomers (a-1) and cationic monomers (a-2).

As the anionic monomer (a-1), there may be used at least one compound selected from the group consisting of unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid.

Examples of the unsaturated sulfonic acid monomers include styrenesulfonic acid, 2-acrylamido-2-methylpropanesulfonic acid, 3-sulfopropyl (meth)acrylic ester and bis(3-sulfopropyl)itaconic ester.

Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, preferred are the unsaturated carboxylic acid monomers in view of good viscosity and injecting property of the resultant inks, and more preferred are acrylic acid and methacrylic acid.

As the cationic monomer (a-2), there may be used at least one compound selected from the group consisting of unsaturated tertiary amine-containing vinyl monomers and unsaturated ammonium salt-containing vinyl monomers. Examples of the unsaturated tertiary amine-containing vinyl monomers include N,N-dimethylaminoethyl (meth)acrylate, N,N-dimethylaminopropyl (meth)acrylate, N,N-diethylaminoethyl (meth)acrylate, N,N-dimethylaminopropyl (meth)acrylamide, vinyl pyrrolidone, 2-vinyl pyridine, 4-vinyl pyridine, 2-methyl-6-vinyl pyridine and 5-ethyl-2-vinyl pyridine.

Examples of the unsaturated ammonium salt-containing vinyl monomers include quaternary ammonium compounds derived from N,N-dimethylaminoethyl (meth)acrylate, quaternary ammonium compounds derived from N,N-diethylaminoethyl (meth)acrylate, and quaternary ammonium compounds derived from N,N-dimethylaminopropyl (meth)acrylate.

Among the above cationic monomers, preferred are N,N-dimethylaminoethyl (meth)acrylate, N,N-dimethylaminopropyl (meth)acrylamide and vinyl pyrrolidone.

Meanwhile, the term "(meth)acrylate" used herein means an "acrylate", a "methacrylate" or a mixture thereof.

These salt-forming group-containing monomers may be used alone or in combination of any two or more thereof.

The constitutional unit derived from the aromatic ring-containing (meth)acrylate monomer (b) is combined with the constitutional unit derived from the salt-forming group-containing monomer (a) to enhance a gloss, a rubbing resistance, etc. Examples of the preferred constitutional unit derived from the aromatic ring-containing (meth)acrylate monomer (b) include those constitutional units represented by the following formula (1):

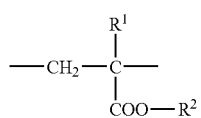
(1)

wherein $R^1$ is a hydrogen atom or a methyl group; and $R^2$ is a substituted or unsubstituted aralkyl group having 7 to 22 carbon atoms or a substituted or unsubstituted aryl group having 6 to 22 carbon atoms.

In the formula (1), $R^2$ is a substituted or unsubstituted aralkyl group having 7 to 22 carbon atoms, preferably 7 to 18 carbon atoms and more preferably 7 to 12 carbon atoms, or a substituted or unsubstituted aryl group having 6 to 22 carbon atoms, preferably 6 to 18 carbon atoms and more preferably 6 to 12 carbon atoms.

Specific examples of $R^2$ include benzyl group, phenethyl group (phenylethyl group), phenoxyethyl group, diphenylmethyl group and trityl group.

The substituents of the aralkyl group or aryl group may contain hetero atoms. Examples of the hetero atoms include a nitrogen atom, an oxygen atom and a sulfur atom.

Specific examples of the substituents of the aralkyl group or aryl group include alkyl, alkoxy and acyloxy groups each preferably having 1 to 9 carbon atoms, hydroxyl group, ether groups, ester groups and nitro group.

The constitutional unit represented by the formula (1) is preferably produced by polymerizing a monomer represented by the following formula (1-1):

wherein $R^1$ and $R^2$ are the same as defined above.

More specifically, the constitutional unit represented by the formula (1) may be produced by polymerizing a monomer such as phenyl (meth)acrylate, benzyl (meth)acrylate, 2-phenylethyl (meth)acrylate, phenoxyethyl (meth)acrylate, 1-naphthalyl acrylate, 2-naphthalyl (meth)acrylate, phthalimidemethyl (meth)acrylate, p-nitrophenyl (meth)acrylate, 2-hydroxy-3-phenoxypropyl (meth)acrylate, 2-methacryloyloxyethyl-2-hydroxypropyl phthalate, 2-acryloyloxyethyl phthalic acid, etc. Among these monomers, preferred is benzyl (meth)acrylate. These monomers may be used alone or in combination of any two or more thereof.

To enhance a storage stability, print density, etc., the main chain may also contain a constitutional unit derived from a (meth)acrylate containing an alkyl group having 1 to 22 carbon atoms, or a monomer represented by the following formula (2) (hereinafter these are generally referred to merely a "hydrophobic monomer (d)"):

wherein $R^3$ is a hydrogen atom or an alkyl group having 1 to 5 carbon atoms; and $R^4$ is an aromatic ring-containing hydrocarbon group having 6 to 22 carbon atoms.

More specifically, the constitutional unit derived from a (meth)acrylate containing an alkyl group having 1 to 22 carbon atoms may be produced by polymerizing a monomer such as methyl (meth)acrylate, ethyl (meth)acrylate, (iso) propyl (meth)acrylate, (iso- or tertiary-)butyl (meth)acrylate, 2-ethylhexyl (meth)acrylate, (iso)octyl (meth)acrylate, (iso)decyl (meth)acrylate, (iso)dodecyl (meth)acrylate, (iso) stearyl (meth)acrylate and behenyl (meth)acrylate. Meanwhile, the terms "(iso- or tertiary-)" and "(iso)" used herein mean both branched structures represented by "iso" and "tertiary", and unbranched structure (i.e., "normal").

In the formula (2), $R^3$ is preferably a hydrogen atom or a methyl group. As the monomer represented by the formula (2), in view of a good print density, there is preferably used at least one compound selected from the group consisting of styrene, vinyl naphthalene, α-methyl styrene, vinyl toluene, ethyl vinyl benzene, 4-vinyl biphenyl and 1,1-diphenyl ethylene. Among these compounds, in view of good print density, storage stability, etc., preferred is at least one styrene-based monomer selected from the group consisting of styrene, α-methyl styrene and vinyl toluene.

The main chain preferably further contains a constitutional unit derived from a nonionic (meth)acrylate-based monomer (e) in view of enhancing the gloss, injection stability and print density.

The nonionic (meth)acrylate-based monomer is preferably a nonionic monomer represented by the following formula (3):

wherein $R^5$ is a hydrogen atom or an alkyl group having 1 to 3 carbon atoms; $R^6$ is an alkylene group having 2 to 18 carbon atoms; n represents an average molar number of addition and is a number of 1 to 30; and $R^7$ is a hydrogen atom, an alkyl group having 1 to 18 carbon atoms or a phenyl group which may be substituted with an alkyl group having 1 to 8 carbon atoms. In the formula (3), in view of polymerizability, etc., $R^5$ is preferably a hydrogen atom or a methyl group, and $R^6$ is preferably an alkylene group having 2 to 4 carbon atoms such as ethylene group, propylene group and tetramethylene group. More specifically, $R^6$ is preferably an ethylene group in view of enhancing the injection property and gloss, and a propylene group or a tetramethylene group in view of enhancing the print density. The suffix n is preferably a number of 2 to 25 and more preferably 4 to 23 in view of good print density and storage stability. If the suffix n is 2 or more, a plurality of $R^6$ groups may be the same or different. If the $R^6$ groups are different from each other, the $R^6$ groups may be bonded to each other in any manner of block bonding and random bonding.

In view of a high print density and a good storage stability, $R^7$ is preferably an alkyl group having 1 to 12 carbon atoms and more preferably an alkyl group having 1 to 8 carbon atoms, or preferably a phenyl group which may be substituted with an alkyl group having 1 to 8 carbon atoms.

Examples of the alkyl group having 1 to 8 carbon atoms include methyl, ethyl, propyl, isopropyl, butyl, tert-butyl, hexyl, octyl and 2-ethylhexyl groups.

Specific examples of the nonionic monomer represented by the formula (3) include hydroxyethyl methacrylate, methoxy polyethylene glycol mono(meth)acrylate, polyethylene glycol mono(meth)acrylate, methoxy polypropylene glycol mono(meth)acrylate, polypropylene glycol mono(meth)acrylate, ethylene glycol/propylene glycol (meth)acrylate, poly(ethylene glycol/propylene glycol) mono(meth)acrylate and octoxy-polyethylene glycol/polypropylene glycol mono(meth)acrylate. These nonionic monomers may be used alone or in combination of any two or more thereof.

The weight ratio of the constitutional unit derived from the salt-forming group-containing monomer (a) (hereinafter calculated as a non-neutralized monomer) to the constitutional unit derived from the aromatic ring-containing (meth) acrylate monomer (b) [(a)/(b)] in the main chain is preferably 1/1 to 1/20, more preferably 1/1.5 to 1/15 and still more preferably 1/2 to 1/10 in view of enhancing the gloss and rubbing resistance of the printed characters or images. When the weight ratio [(a)/(b)] falls within the above-specified range, the printed coated paper exhibits an excellent gloss.

The content of the constitutional unit derived from the salt-forming group-containing monomer (a) in the main chain is preferably 3 to 30% by weight, more preferably 5 to 20% by weight and still more preferably 5 to 15% by weight in view of enhancing a dispersibility of the water-insoluble graft polymer in water.

The content of the constitutional unit derived from the aromatic ring-containing (meth)acrylate monomer (b) in the main chain is preferably 10 to 80% by weight, more preferably 15 to 75% by weight and still more preferably 20 to 70% by weight in view of enhancing the gloss and rubbing resistance.

The content of the constitutional unit derived from a (meth)acrylate containing an alkyl group having 1 to 22 carbon atoms in the main chain is preferably 0 to 10% by weight and more preferably 0 to 5% by weight in view of enhancing the dispersion stability. The content of the constitutional unit derived from the monomer represented by the formula (2) in the main chain is preferably 0 to 30% by weight and more preferably 0 to 15% by weight in view of enhancing the print density and resistance to markers. Also, the content of the constitutional unit derived from a hydrophobic monomer (d) in the main chain is preferably 0 to 40% by weight and more preferably 0 to 20% by weight in view of enhancing the dispersion stability, print density and resistance to markers.

Further, the content of the constitutional unit derived from a nonionic (meth)acrylate-based monomer (e) in the main chain is preferably 0 to 60% by weight and more preferably 10 to 50% by weight in view of enhancing the print density, gloss and injection property.

The water-insoluble graft polymer used in the present invention contains the constitutional unit derived from a hydrophobic monomer (c) as a side chain in view of containing a sufficient amount of a colorant and enhancing the print density.

Examples of the hydrophobic monomer from which the constitutional unit (c) is derived are vinyl monomers. Specific examples of the hydrophobic monomer include the following monomers (c-1) to (c-3).

(c-1) Styrene-Based Monomers:

Examples of the styrene-based monomers include styrene, α-methyl styrene and vinyl toluene. Among these styrene-based monomers, preferred is styrene. The side chain containing the constitutional unit derived from the styrene-based monomer may be produced by copolymerizing a styrene-based macromer having a polymerizable functional group at one terminal end thereof (hereinafter referred to merely as "styrene-based macromer"). Examples of the styrene-based macromer include styrene homopolymers having a polymerizable functional group at one terminal end thereof, and copolymers of styrene with other monomers which have a polymerizable functional group at one terminal end thereof. The polymerizable functional group bonded to one terminal end of the styrene-based macromer is preferably an acryloyloxy group or a methacryloyloxy group. Examples of the other monomers copolymerizable with styrene include the below-mentioned monomers (c-2) and (c-3) and acrylonitrile. In the side chain or the styrene-based macromer, the constitutional unit derived from the styrene-based monomer has a largest content. Specifically, in view of incorporating a sufficient amount of the colorant into the water-insoluble graft polymer to enhance the print density, the content of the constitutional unit derived from the styrene-based monomer in the side chain or the styrene-based macromer is preferably 60% by weight or higher, more preferably 70% by weight or higher and still more preferably 90% by weight or higher.

The number-average molecular weight of the styrene-based macromer is preferably in the range of from 1000 to 10000 and more preferably 2000 to 8000 in view of controlling a viscosity thereof to a low level while increasing a copolymerization ratio thereof to enhance a storage stability of the resultant ink.

The number-average molecular weight of the styrene-based macromer may be measured by gel permeation chromatography using polystyrene as a standard substance and using tetrahydrofuran containing 50 mmol/L of acetic acid as a solvent.

The styrene-based macromer is commercially available, for example, from Toagosei Co., Ltd., as product names of AS-6, AS-6S, AN-6, AN-6S, HS-6, HS-6S, etc.

(c-2) (Meth)Acrylic Ester (Which Contains an Alkyl Group having 1 to 22 Carbon Atoms and Preferably 1 to 18 Carbon Atoms, and May Also have a Hydroxyl Group):

Specific examples of the (meth)acrylic ester include methyl (meth)acrylate, ethyl (meth)acrylate, (iso)propyl (meth)acrylate, 2-hydroxyethyl (meth)acrylate, (iso- or tertiary-)butyl (meth)acrylate, 2-ethylhexyl (meth)acrylate, (iso)octyl (meth)acrylate, (iso)decyl (meth)acrylate and (iso)stearyl (meth)acrylate. The side chain containing the constitutional unit derived from the (meth)acrylic ester having 1 to 22 carbon atoms which may also have a hydroxyl group, may be produced by copolymerizing an alkyl (meth)acrylate-based macromer having a polymerizable functional group at one terminal end thereof (hereinafter referred to merely as "alkyl (meth)acrylate-based macromer"). As the alkyl (meth)acrylate-based macromer, there may be used, for example, methyl methacrylate-based macromers, butyl acrylate-based macromers, isobutyl methacrylate-based macromers and lauryl methacrylate-based macromers. Examples of the alkyl (meth)acrylate-based macromer include alkyl (meth)acrylate homopolymers having a polymerizable functional group at one terminal end thereof, and copolymers of the alkyl (meth)acrylate with other monomers which have a polymerizable functional group at one terminal end thereof. The polymerizable functional group bonded to one terminal end of the alkyl (meth)acrylate-based macromer is preferably an acryloyloxy group or a methacryloyloxy group. Examples of the other monomers copolymerizable with the alkyl (meth)acrylate include the above-mentioned monomer (c-1) and the below-mentioned monomer (c-3). In the side chain or the alkyl (meth)acrylate-based macromer, the constitutional unit derived from the monomer (c-2) has a largest content. Specifically, the content of the constitutional unit derived from the monomer (c-2) in the side chain or the alkyl (meth)acrylate-based macromer is preferably 60% by weight or higher, more preferably 70% by weight or higher and still more preferably 90% by weight or higher.

(c-3) Aromatic Ring-Containing (Meth)acrylate:

As the aromatic ring-containing (meth)acrylate, there are preferably used those represented by the above formula (1-1). Examples of the aromatic ring-containing (meth)acrylate include benzyl (meth)acrylate, phenoxyethyl (meth)acrylate, 2-hydroxy-3-phenoxypropyl acrylate and 2-methacryloyloxyethyl-2-hydroxypropyl phthalate. Among these aromatic ring-containing (meth)acrylates, preferred is benzyl (meth)acrylate. The side chain containing the constitutional unit derived from the aromatic ring-containing (meth)acrylate may be produced by copolymerizing an aromatic ring-containing (meth)acrylate-based macromer having a polymerizable functional group at one terminal end thereof (hereinafter referred to merely as "aromatic ring-containing (meth)acrylate-based macromer"). Examples of the aromatic ring-containing (meth)acrylate-based macromer include aromatic ring-containing (meth)acrylate homopolymers having a polymerizable functional group at one terminal end thereof, and copolymers of the aromatic ring-containing (meth)acrylate with other monomers which have a polymerizable functional group at one terminal end thereof. The polymerizable functional group bonded to one terminal end of the aromatic ring-containing (meth)acrylate-based macromer is preferably an acryloyloxy group or a methacryloyloxy group. Examples of the other monomers copolymerizable with the aromatic ring-containing (meth)acrylate include the above-mentioned monomers (c-1) and (c-2). In the aromatic ring-containing (meth)acrylate-based macromer, the constitutional unit derived from the monomer (c-3) has a largest content. Since the water-insoluble graft polymer of the present invention contains the constitutional unit derived from the aromatic ring-containing (meth)acrylate in the main chain, in order to attain the effects of the present invention, the content of the constitutional unit derived from the aromatic ring-containing (meth)acrylate in the side chain or the aromatic ring-containing (meth)acrylate-based macromer is preferably less than 50% by weight and more preferably 40% by weight or lower.

The side chain may also contain a constitutional unit derived from the other monomer copolymerizable with the above hydrophobic monomer. Examples of the other monomer include acrylonitrile, vinyl naphthalene, ethyl vinyl benzene, 4-vinyl biphenyl and 1,1-diphenyl ethylene.

These other monomers may be used alone or in combination of any two or more thereof.

The hydrophobic monomer from which the constitutional unit (c) is derived is preferably the styrene-based monomer (c-1) in view of enhancing the print density.

The above styrene-based macromer, alkyl (meth)acrylate-based macromer, and aromatic ring-containing (meth)acrylate-based macromer are hereinafter generally referred to merely as a "macromer".

The weight ratio of the main chain containing the constitutional unit derived from the salt-forming group-containing monomer (a) and the constitutional unit derived from the aromatic ring-containing (meth)acrylate monomer (b), to the side chain containing the constitutional unit derived from the hydrophobic monomer (c) [main chain/side chain] is 1/1 to 20/1, more preferably 3/2 to 15/1 and still more preferably 2/1 to 10/1 in view of enhancing the print density, gloss and rubbing resistance (calculated assuming that the polymerizable functional group is contained in the side chain, hereinafter calculated in the same way).

The water-insoluble graft polymer used in the present invention may further contain side chains composed of other constitutional units, for example, an organopolysiloxane side chain. Such a side chain is preferably produced, for example, by copolymerizing a silicone-based macromer having a polymerizable functional group at one terminal end thereof which is represented by the following formula (4):

$$CH_2=C(CH_3)-COOC_3H_6-[Si(CH_3)_2-O]_t-Si(CH_3)_3 \quad (4)$$

wherein t is a number of 8 to 40.

The water-insoluble graft polymer used in the present invention may be produced by copolymerizing a monomer mixture containing the salt-forming group-containing monomer (a), the aromatic ring-containing (meth)acrylate monomer (b) and the macromer, and preferably by copolymerizing the above monomer mixture with a monomer mixture containing the hydrophobic monomer (d) and/or the nonionic monomer (e) (hereinafter, these mixtures are generally referred to as a "monomer mixture").

The content of the salt-forming group-containing monomer (a) in the monomer mixture (content of non-neutralized monomer) or the content of the constitutional unit derived from the salt-forming group-containing monomer (a) which is contained in the main chain in the water-insoluble graft polymer is preferably 3 to 30% by weight, more preferably 3 to 20% by weight and still more preferably 5 to 15% by weight in view of enhancing a dispersion stability of the resultant water dispersion, a gloss of the resultant prints, etc.

The content of the aromatic ring-containing (meth)acrylate monomer (b) in the monomer mixture or the content of the constitutional unit derived from the aromatic ring-containing (meth)acrylate monomer (b) which is contained in the main chain in the water-insoluble graft polymer is preferably 10 to 80% by weight, more preferably 15 to 70% by weight and still more preferably 20 to 60% by weight in view of enhancing the gloss and rubbing resistance of the resultant prints, etc.

The content of the macromer in the monomer mixture or the content of the constitutional unit derived from the hydrophobic monomer (c) which is contained in the side chain in the water-insoluble graft polymer is preferably 5 to 50% by weight, more preferably 5 to 40% by weight and still more preferably 5 to 35% by weight in view of enhancing a print density of the resultant prints, etc.

The content of the hydrophobic monomer (d) in the monomer mixture, i.e., the content of the constitutional unit derived from the hydrophobic monomer (d) in the water-insoluble graft polymer is preferably 0 to 40% by weight and more preferably 0 to 20% by weight in view of the print density, dispersion stability, resistance to markers, etc.

The content of the nonionic monomer (e) in the monomer mixture, i.e., the content of the constitutional unit derived from the nonionic monomer (e) in the water-insoluble graft polymer is preferably 0 to 60% by weight and more preferably 10 to 50% by weight in view of the injection stability, gloss, print density, etc.

The content ratio by weight of the salt-forming group-containing monomer (a) to the macromer in the monomer mixture [content of the salt-forming group-containing monomer/content of the macromer], or the content ratio by weight of the constitutional unit derived from the salt-forming group-containing monomer (a) contained in the main chain to the constitutional unit derived from the hydrophobic monomer (c) contained in the side chain [content of the constitutional unit derived from the salt-forming group-containing monomer (a)/content of the constitutional unit derived from the hydrophobic monomer (c)] both of which are contained in the water-insoluble graft polymer, is preferably 1/5 to 2/1 and more preferably 1/4 to 2/1 in view of the dispersion stability and print density, etc.

The content ratio by weight of the aromatic ring-containing (meth)acrylate monomer (b) to the nonionic monomer (e) in the monomer mixture [content of the aromatic ring-containing (meth)acrylate monomer (b)/content of the nonionic monomer (e)], or the content ratio by weight of the constitutional unit derived from the aromatic ring-containing (meth)acrylate monomer (b) to the constitutional unit derived from the nonionic monomer (e) which are contained in the water-insoluble graft polymer [content of the constitutional unit derived from the aromatic ring-containing (meth)acrylate monomer (b)/content of the constitutional unit derived from the nonionic monomer (e)] is preferably 5/1 to 1/2 and more preferably 4/1 to 1/2 in view of the gloss and print density, etc.

The term "water-insoluble" used herein for the water-insoluble graft polymer means that the water-insoluble graft polymer whose salt-forming group is neutralized 100% with sodium hydroxide or acetic acid according to the kind of salt-forming group, is dissolved at 25° C. in 100 g of water in an amount of preferably 10 g or less in view of reduction in viscosity of the resultant water-based ink, more preferably 5 g or less and still more preferably 1 g or less.

In the present invention, the water-insoluble graft polymer in which the salt-forming group of the salt-forming group-containing monomer is neutralized with the below-mentioned neutralizing agent is used. The degree of neutralization of the salt-forming group is preferably 10 to 200%, more preferably 20 to 150% and still more preferably 30 to 100%.

When the salt-forming group is an anionic group, the degree of neutralization is calculated according to the following formula:

$$[\text{weight (g) of neutralizing agent/equivalent of neutralizing agent}]/[\text{acid value of polymer (KOH mg/g)} \times \text{weight (g) of polymer}/(56 \times 1000)] \times 100$$

When the salt-forming group is a cationic group, the degree of neutralization is calculated according to the following formula:

$$[\text{weight (g) of neutralizing agent/equivalent of neutralizing agent}]/[\text{amine value of polymer (HCl mg/g)} \times \text{weight (g) of polymer}/(36.5 \times 1000)] \times 100$$

The acid value or amine value may be calculated from the respective constitutional units of the water-insoluble graft polymer, or may also be determined by the method of subjecting a solution prepared by dissolving the polymer in an appropriate solvent such as methyl ethyl ketone to titration.

The weight-average molecular weight of the water-insoluble graft polymer used in the present invention is preferably 5000 to 500000, more preferably 10000 to 400000 and still more preferably 100000 to 300000 in view of a good dispersion stability of the colorant as well as water resistance and injection property of the resultant ink.

Meanwhile, the weight-average molecular weight of the water-insoluble graft polymer may be measured by gel permeation chromatography using dimethylformamide containing 60 mmol/L of phosphoric acid and 50 mmol/L of lithium bromide as a solvent and using polystyrene as a standard substance.

The water-insoluble graft polymer used in the present invention may be produced by copolymerizing the monomer mixture by methods such as bulk polymerization, solution polymerization, suspension polymerization and emulsion polymerization. Among these polymerization methods, preferred is the solution polymerization.

The solvent for the solution polymerization method is preferably an organic polar solvent. The organic polar solvent miscible with water may be used in the form of a mixture with water.

Examples of the organic polar solvents include aliphatic alcohols having from 1 to 3 carbon atoms such as methanol, ethanol and propanol; ketones such as acetone, methyl ethyl ketone and methyl isobutyl ketone; and esters such as ethyl acetate. Among these solvents, preferred are methanol, ethanol, acetone, methyl ethyl ketone and mixed solvents of at least one thereof with water.

The polymerization may be carried out in the presence of a radical polymerization initiator. Preferred radical polymerization initiators are azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile), and 1,1'-azobis(1-cyclohexanecarbonitrile). Alternatively, organic peroxides such as t-butyl peroxyoctoate, di-t-butyl peroxide and dibenzoyl oxide may also be used.

The amount of the radical polymerization initiator to be used is preferably from 0.001 to 5 mol and preferably from 0.01 to 2 mol per 1 mol of the monomer mixture.

The polymerization may also be carried out in the presence of a chain transfer agent. Specific examples of the chain transfer agent include mercaptans such as octyl mercaptan, n-dodecyl mercaptan, t-dodecyl mercaptan, n-tetradecyl mercaptan, mercaptoethanol, 3-mercapto-1,2-propanediol and mercaptosuccinic acid; thiuram disulfides; hydrocarbons; unsaturated cyclic hydrocarbon compounds; and unsaturated heterocyclic compounds. These chain transfer agents may be used alone or in combination of any two or more thereof.

The polymerization conditions of the monomer mixture vary depending upon the kinds of radical polymerization initiator, monomers, solvent, etc., to be used, and the polymerization is generally conducted at a temperature of preferably 30 to 100° C. and preferably 50 to 80° C., and at a time of preferably 1 to 20 h. The polymerization is preferably conducted in an atmosphere of an inert gas such as nitrogen and argon.

After completion of the polymerization, the water-insoluble graft polymer thus produced is isolated from the reaction product solution by a method such as reprecipitation and removal of solvent by distillation. The thus obtained water-insoluble graft polymer may be purified by repeated reprecipitation, membrane separation, chromatography, extraction, etc., for removing unreacted monomers, etc.

(Colorant)

The colorant used in the present invention may be either hydrophobic dye or pigment, or may be a mixture thereof in an arbitrary mixing ratio. Among these colorants, to meet the recent strong demand for a high weather resistance, preferred is the pigment.

The pigment may be either organic or inorganic. The organic or inorganic pigment may be used in combination with an extender pigment, if required.

Examples of the organic pigments include azo pigments, disazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include C.I. Pigment Yellow 13, 17, 74, 83, 97, 109, 110, 120, 128, 139, 151, 154, 155, 174, 180; C.I. Pigment Red 48, 57:1, 122, 146, 176, 184, 185, 188, 202; C.I. Pigment Violet 19, 23; C.I. Pigment Blue 15, 15:1, 15:2, 15:3, 15:4, 16, 60; and C.I. Pigment Green 7, 36.

Examples of the inorganic pigments include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

Examples of the extender pigment include silica, calcium carbonate and talc.

As the dye, hydrophobic dyes are preferably used because easily become contained in the water-insoluble graft polymer. Examples of the hydrophobic dyes include oil dyes and disperse dyes. To allow the dye to efficiently become contained in the water-insoluble graft polymer, the solubility of the hydrophobic dye is preferably 2 g/L or higher and more preferably from 20 to 500 g/L as measured at 25° C. based on the organic solvent to be used for dissolving the hydrophobic dye upon the production of the water dispersion.

Examples of the oil dyes include C.I. Solvent Black 3, 7, 27, 29, 34, 45; C.I. Solvent Yellow 14, 16, 29, 56, 82, 83:1; C.I. Solvent Red 1, 3, 8, 18, 24, 27, 43, 49, 51, 72, 73; C.I. Solvent Violet 3; C.I. Solvent Blue 2, 4, 11, 44, 64, 70; C.I. Solvent Green 3, 7; and C.I. Solvent Orange 2.

Examples of commercially available oil dyes include Nubian Black PC-0850, Oil Black HBB, Oil Black 860, Oil Yellow 129, Oil Yellow 105, Oil Pink 312, Oil Red 5B, Oil Scarlet 308, Vali Fast Blue 2606 and Oil Blue BOS (all product names of Orient Chemical Industries, Ltd.); and Neopen Yellow 075, Neopen Mazenta SE1378, Neopen Blue 808, Neopen Blue 807, Neopen Blue FF4012 and Neopen Cyan FF4238 (all product names of BASF AG.).

Examples of the preferred disperse dyes include C.I. Disperse Yellow 5, 42, 54, 64, 79, 82, 83, 93, 99, 100, 119, 122, 124, 126, 160, 184:1, 186, 198, 199, 204, 224, 237; C.I. Disperse Orange 13, 29, 31:1, 33, 49, 54, 55, 66, 73, 118, 119, 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, 368; and C.I. Disperse Green 6:1, 9. Among these dyes, preferred are C.I. Solvent Yellow 29 and 30 for yellow colorant, C.I. Solvent Blue 70 for cyan colorant, C.I. Solvent Red 18 and 49 for magenta colorant, and C.I. Solvent Black 3 and 7 and nigrosine black dyes for black colorant.

To enhance the dispersion stability and print density, the content of the colorant in the water dispersion and water-based ink of the present invention is preferably from 1 to 30% by weight and more preferably 3 to 20% by weight.

To enhance the print density, the colorant is preferably used in an amount of 20 to 1000 parts by weight, more preferably 50 to 900 parts by weight and still more preferably 100 to 800 parts by weight based on 100 parts by weight of solid content of the water-insoluble graft polymer.

(Water Dispersion of Water-Insoluble Graft Polymer Particles Containing Colorant and Water-Based Ink Using the Same)

The water dispersion of the present invention is preferably produced through the following steps (1) and (2):

Step (1): Dispersing a mixture containing the water-insoluble graft polymer, organic solvent, neutralizing agent, colorant, water, etc.;

Step (2): Removing the organic solvent from the resultant dispersion.

In the step (1), first, the water-insoluble graft polymer is dissolved in an organic solvent, and then the colorant, neutralizing agent and water together with an optional surfactant, etc., are added to the solution of the water-insoluble graft polymer in the organic solvent under mixing to obtain a dispersion of an oil-in-water type. The content of the colorant in the dispersion is preferably from 5 to 50% by weight. The content of the organic solvent in the dispersion is preferably from 10 to 70% by weight. The content of the water-insoluble graft polymer in the dispersion is preferably from 2 to 40% by weight, and the content of water in the dispersion is preferably from 10 to 70% by weight. The degree of neutralization of the polymer is not particularly limited. In general, the degree of neutralization is preferably controlled such that the finally obtained water dispersion exhibits a neutral liquid property, for example, a pH of 4.5 to 10. The pH of the dispersion may also be determined from the desirable degree of neutralization for the water-insoluble graft polymer. The water-insoluble graft polymer may be neutralized with the neutralizing agent in advance.

Examples of the preferred organic solvents include alcohol solvents, ketone solvents and ether solvents, i.e., the organic solvents are preferably those having a solubility in water of 50% by weight or lower and more preferably 10% by weight or higher as measured at 20° C.

Examples of the alcohol solvents include n-butanol, tertiary butanol, isobutanol and diacetone alcohol. Examples of the ketone solvents include methyl ethyl ketone, diethyl ketone and methyl isobutyl ketone. Examples of the ether solvents include dibutyl ether and dioxane. Among these solvents, preferred is methyl ethyl ketone.

As the neutralizing agent, acids or bases may be used according to the kind of the salt-forming group in the water-insoluble graft polymer. Examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine and triethanolamine.

The dispersing method used in the step (1) is not particularly limited. The water-insoluble graft polymer may be finely divided into polymer particles having a desired average particle size only by substantial dispersion procedure. Preferably, the mixture is first subjected to preliminary dispersion procedure, and then to the substantial dispersion procedure by applying a shear stress thereto so as to control the average particle size of the water-insoluble graft polymer particles to a desired value.

Upon subjecting the mixture to the preliminary dispersion procedure, there may be used ordinary mixing or stirring devices such as anchor blades. Examples of the preferred mixing or stirring devices include high-speed mixers or stirrers such as "Ultra Disper" (tradename: available from Asada Tekko Co., Ltd., "Ebara Milder" (tradename: available from Ebara Seisakusho Co., Ltd.), "TK Homomixer", "TK Pipeline Mixer", "TK Homo Jetter", "TK Homomic Line Flow" and "Filmix" (tradenames: all available from Tokushu Kika Kogyo Co., Ltd.), "Clearmix" (tradename: available from M-Technic Co., Ltd.) and "K.D. Mill" (tradename: available from Kinetics Dispersion Inc.).

To apply the shear stress to the mixture in the substantial dispersion procedure, there may be used, for example, kneading machines such as roll mills, beads mills, kneaders and extruders, homo-valve-type high-pressure homogenizers such as typically "High-Pressure Homogenizer" (tradename: available from Izumi Food Machinery Co., Ltd.) and "Mini-Labo 8.3H Model" (tradename: available from Rannie Corp.), and chamber-type high-pressure homogenizers such as "Micro-Fluidizer" (tradename: available from Microfluidics Inc.), "Nanomizer" (tradename: available from Nanomizer Co., Ltd.), "Altimizer" (tradename: available from Sugino Machine Co., Ltd.), "Genus PY" (tradename: available from Hakusui Kagaku Co., Ltd.) and "DeBEE 2000" (tradename: Nippon BEE Co., Ltd.). Among these apparatuses, the high-pressure homogenizers are preferred in view of reducing a particle size of the pigment contained in the mixture.

In the step (2), the organic solvent is removed from the thus obtained dispersion to obtain a water dispersion of the water-insoluble graft polymer containing the colorant. The removal of the organic solvent from the dispersion may be performed by an ordinary method such as distillation under reduced pressure. The organic solvent is substantially completely removed from the thus obtained water dispersion of the water-insoluble graft polymer particles. The content of the residual organic solvent in the water dispersion is 0.1% by weight or lower and preferably 0.01% by weight or lower.

In the above water dispersion, solid components made of the water-insoluble graft polymer particles containing the colorant are dispersed in water as a main solvent.

The configuration of the water-insoluble graft polymer particles containing the colorant is not particularly limited as long as the colorant and the water-insoluble graft polymer are formed into a particle shape. Examples of the configuration of the particles include the particle configuration in which the colorant is enclosed in the respective water-insoluble graft polymer particles, the particle configuration in which the colorant is uniformly dispersed in the respective water-insoluble graft polymer particles, and the particle configuration in which the colorant is exposed onto a surface of the respective water-insoluble graft polymer particles.

The water dispersion of the water-insoluble graft polymer particles may be directly used as a water-based ink, and may further contain various additives ordinarily used in water-based inks for ink-jet printing such as wetting agents, penetrants, dispersants, viscosity modifiers, defoaming agents, mildew-proof agents, anti-corrosion agents, etc.

The average particle size of the water-insoluble graft polymer particles containing the colorant which are contained in the water dispersion and the water-based ink is preferably from 0.01 to 0.5 μm, more preferably from 0.03 to 0.3 μm and still more preferably from 0.05 to 0.2 μm in view of preventing clogging in a printer and enhancing the dispersion stability, etc. The average particle size may be measured using a laser particle analysis system "ELS-8000" (cumulants analysis) available from Otsuka Denshi Co., Ltd., under the following conditions:

Temperature: 25° C.

Angle between incident light and detector: 90°

Cumulative frequency: 100 times

Refractive index of dispersing medium: refractive index of water (1.333)

Measuring concentration: $5 \times 10^{-3}$% by weight

The content (solid content) of the water-insoluble graft polymer particles containing the colorant which are contained in the water dispersion and the water-based ink is preferably controlled to from 1 to 30% by weight and more preferably from 3 to 25% by weight in view of the print density and injection stability, etc.

The content of water in the water dispersion and the water-based ink of the present invention is preferably from 30 to 90% by weight and more preferably from 40 to 80% by weight.

The surface tension of the water dispersion of the present invention is preferably from 30 to 65 mN/m and more preferably from 35 to 60 mN/m as measured at 20° C., and the surface tension of the water-based ink of the present invention is preferably from 25 to 50 mN/m and more preferably from 27 to 45 mN/m as measured at 20° C.

The viscosity of a 10 wt % solution of the water dispersion is preferably from 2 to 6 mPa·s and more preferably from 2 to 5 mPa·s as measured at 20° C. to produce a water-based ink having a suitable viscosity therefrom. The viscosity of the water-based ink is preferably from 2 to 12 mPa·s and more preferably from 2.5 to 10 mPa·s in view of a good injection property.

The water-based ink of the present invention exhibits a high print density when images or characters are printed therewith on an ordinary paper, and is excellent in gloss, image clarity and image clarity property including both of the image clarity and the gloss when images or characters are printed therewith on a coated paper. The print density as measured by the following standard test (1) is preferably 1.10 or more, more preferably 1.15 or more and still more preferably 1.20 or more, and the 60° gloss as measured by the following standard test (2) is preferably 65 or more, more preferably 70 or more and still more preferably 75 or more.

Standard Test (1):

After allowing an ordinary paper (woodfree ordinary paper: tradename "KA4250NT" available from Epson Corp.) with a printed solid image to stand at 25° C. for 24 h, the print density is measured by a densitometer.

Standard Test (2):

After allowing a coated paper (photographic paper: tradename "KA450PSK" available from Epson Corp.) with a printed solid image to stand at 25° C. for 24 h, the 60° gloss is measured by a glossmeter.

Also, the water-based ink of the present invention is preferably such an water-based ink for ink-jet printing which exhibits an image clarity (C %) of 15 or more, preferably 20 or more and more preferably 25 or more as measured by the following standard test (3).

Standard Test (3):

After allowing a coated paper (photographic paper: tradename "KA450PSK" available from Epson Corp.) with a printed solid image to stand at 25° C. for 24 h, the image clarity (C %) at an incident angle of 45° (comb width: 2.0 mm) is measured by an image clarity meter.

The "image clarity" used herein means a value of evaluation for a clearness or distortion of printed images on the paper when the image reflected from the paper are observed. The higher the value of the image clarity, the more excellent the clearness and the less the distortion of the images reflected become as well as the more naturally the images are observed.

Further, the water-based ink of the present invention preferably has a value of an image clarity property including the image clarity and the gloss of 10 or more, preferably 15 or more and still more preferably 20 or more when the value of the image clarity property is calculated according to the following formula:

[(60° gloss as measured by the above standard test (2))×(image clarity (C %) as measured by the above standard test (3)]/100:

The "image clarity property" used herein means a value of evaluation for both gloss and clearness or distortion of the images reflected, i.e., is an index of gloss and clarity or distortion of printed images which are required in photographic applications. The higher the image clarity property, the more excellent the gloss and the more clearly the images are observed without distortion.

In the respective standard tests, as the colorant, there is used C.I. Pigment Red 122 or C.I. Pigment Violet 19.

(Ink-Jet Printing Method)

In the ink-jet printing method of the present invention, images or characters are printed and recorded on an ordinary paper or a coated paper as a recording medium with the above water-based ink for ink-jet printing. The inkjet printing method may be of either a thermal type or a piezoelectric type.

The coated paper used in the present invention include those applicable to the ink-jet printing method. The coated paper may be made of papers, plastics and composite materials thereof, and is preferably a void-type glossy recording medium having a porous ink-accepting layer.

The "porous ink-accepting layer" has a layer composed of porous inorganic particles such as alumina and silica, and a water-soluble resin (binder). As the void-type glossy recording medium having such a porous ink-accepting layer, there may be used known recording media, for example, those described in "Applications of Ink-Jet Printers, and Materials used therefor" published by CMC Co., Ltd., 2002, pp. 174 to 181.

The coated paper used in the present invention is such a void-type glossy recording medium whose surface has a specular gloss and which preferably exhibits a 60° gloss of 60 or less, more preferably 55 or less and still more preferably 50 or less but preferably 15 or more. Here, the gloss is a value measured by a glossmeter, for example, "HANDY GLOSSMETER PG-1 (tradename)" available from Nippon Denshoku Industries Co., Ltd.

Specific examples of the commercially available coated papers usable in the present invention include "Photographic Paper (glossy)" available from Epson Corp., and "Super Photo Paper SP-101" available from Canon Corp.

In the ink-jet printing method of the present invention, images or characters are printed with the water-based ink for ink-jet printing according to the present invention on the void-type glossy recording medium having a porous ink-accepting layer by an ink-jet printer, thereby obtaining prints exhibiting a high gloss.

The water-based ink for ink-jet printing which contains the water dispersion for ink-jet printing of the present invention can show a high print density when images or characters are printed therewith on an ordinary paper, and is excellent in gloss, image clarity and image clarity property when images or characters are printed therewith on a coated paper, as well as can exhibit excellent rubbing resistance and injection stability.

The following examples further describe and demonstrate embodiments of the present invention, The examples are given only for the purpose of illustration and are not to be construed as limitations of the present invention.

PRODUCTION EXAMPLES 1 AND 2 AND COMPARATIVE PRODUCTION EXAMPLE 1

Twenty parts by weight of methyl ethyl ketone and 0.03 part by weight of a chain transfer agent (2-mercaptoethanol) together with 10% of 200 parts by weight of a monomer mixture shown in Table 1 were charged into a reaction vessel and mixed with each other, and then an inside of the reaction vessel was fully purged with a nitrogen gas to thereby obtain a mixed solution.

Separately, remaining 90% of the monomer mixture shown in Table 1 was charged into a dropping funnel, and further 0.27 part by weight of the chain transfer agent (2-mercaptoethanol), 60 parts by weight of methyl ethyl ketone and 1.2 parts by weight of 2,2'-azobis(2,4-dimethylvaleronitrile) were added thereto and mixed with each other, and an inside of the dropping funnel was fully purged with a nitrogen gas to thereby obtain a mixed solution.

The mixed solution in the reaction vessel was heated to 65° C. under stirring in a nitrogen atmosphere, and then the mixed solution in the dropping funnel was gradually dropped thereinto for 3 h. After the elapse of 2 h from completion of the dropping, a solution prepared by dissolving 0.3 part by weight of 2,2'-azobis(2,4-dimethylvaleronitrile) in 5 parts by weight of methyl ethyl ketone was added to the obtained solution, and the resultant reaction solution was further aged at 65° C. for 2 h and at 70° C. for 2 h to obtain a polymer solution.

The weight-average molecular weight of the thus obtained polymer was measured by a gel chromatography using a dimethylformamide solution containing 60 mmol/L of phosphoric acid and 50 mmol/L of lithium bromide as a solvent and using polystyrene as a standard substance. The results are shown in Table 1.

TABLE 1

|  | Production Example 1 | Production Example 2 | Production Comparative Example 1 |
| --- | --- | --- | --- |
| Kind of Monomer |  |  |  |
| (b) Benzyl methacrylate | 50 | 50 |  |
| (d) Styrene monomer |  |  | 50 |
| (e) Polyethylene glycol monomethacrylate | 10 |  | 10 |
| (e) Polypropylene glycol methacrylate | 15 | 25 | 15 |
| (a) Methacrylic acid | 10 | 10 | 10 |
| (c) Styrene Macromer | 15 | 15 | 15 |
| Weight-average molecular weight | 113000 | 104000 | 109000 |

Meanwhile, the numbers indicated in Table 1 represent weight parts of the compounds used, and details of the respective compounds are shown below.

Styrene Macromer: "AS-6S" (tradename) available from Toagosei Co., Ltd.; number-average molecular weight: 6000; polymerizable functional group: methacryloyloxy group Polyethylene Glycol Monomethacrylate: average molar number of addition of ethyleneoxide: 9: "NK-ESTER M-90G" (tradename) available from Shin-Nakamura Kagaku Co., Ltd.

Polypropylene Glycol Monomethacrylate: average molar number of addition of propyleneoxide: 9: "BLENMER PP-500" (tradename) available from Nippon Yushi Co., Ltd.

EXAMPLE 1

Twenty five parts by weight of the polymer produced by drying the polymer solution obtained in PRODUCTION EXAMPLE 1 under reduced pressure was dissolved in 70 parts by weight of methyl ethyl ketone. Further, 4.1 parts by weight of a neutralizing agent (a 5N sodium hydroxide aqueous solution) and 230 parts by weight of ion-exchanged water were added to the resultant solution to neutralize a salt-forming group of the polymer (degree of neutralization: 75%), and then 75 parts by weight of a dimethylquinacri-done dye (C.I. Pigment Red 122 "IRGAPHOR MAGENTA DMQ (tradename)" available from Ciba Specialty Chemicals Corp.) was added into the reaction solution and mixed with each other at 20° C. for 1 h using disper blades. The thus obtained mixture was dispersed under a pressure of 200 MPa by passing through a dispersing apparatus "MICROF-LUIDIZER" (tradename) available from Microfluidics Corp., 10 times.

The resultant kneaded material was mixed with 250 parts by weight of ion-exchanged water under stirring, and methyl ethyl ketone was removed from the resultant mixture under reduced pressure at 60° C., followed by removing a part of the water therefrom. The obtained mixture was filtered through a 5 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water dispersion of pigment-containing water-insoluble graft polymer particles which had a solid content of 20% by weight.

Forty parts by weight of the thus obtained water dispersion of pigment-containing water-insoluble graft polymer particles, 10 parts by weight of glycerol, 7 parts by weight of triethylene glycol monobutyl ether (TEGMBE), 1 part by weight of "SURFINOL 465" available from Nisshin Kagaku Kogyo Co., Ltd., 0.3 part by weight of "PROXEL XL2" available from Avicia Co., Ltd., and 41.7 parts by weight of ion-exchanged water were mixed with each other, and the resultant mixed solution was filtered through a 1.2 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water-based ink as shown in Table 2.

EXAMPLE 2

In the same manner as in EXAMPLE 1 except for using an unsubstituted quinacridone pigment (C.I. Pigment Violet 19; "Hostaperm Red E5B02" (tradename) available from Clariant Japan Co., Ltd.) in place of the dimethylquinacri-done pigment, the water-based ink as shown in Table 2 was produced.

EXAMPLE 3

In the same manner as in EXAMPLE 1 except for using the polymer solution obtained in PRODUCTION EXAMPLE 2 in place of the polymer solution obtained in PRODUCTION EXAMPLE 1, the water-based ink as shown in Table 2 was produced.

COMPARATIVE EXAMPLE 1

In the same manner as in EXAMPLE 1 except for using the polymer solution obtained in COMPARATIVE PRODUCTION EXAMPLE 1 in place of the polymer solution obtained in PRODUCTION EXAMPLE 1, the water-based ink as shown in Table 2 was produced.

As a result, it was confirmed that the particles contained in the water dispersions obtained in Examples 1 to 3 and Comparative Example 1 all had an average particle size of 0.05 to 0.2 μm.

Next, ink characteristics of the respective water-based inks obtained in Examples 1 to 3 and Comparative Example 1 were measured by the following methods. The results are shown in Table 2.

(1) Print Density [Standard Test (1)]

Solid image printing was carried out on an ordinary paper (woodfree ordinary paper "KA4250NT (tradename)" available from Epson Corp.) using an ink-jet printer "Model EM930C" available from Epson Corp., under the following printing conditions:

Kind of Paper: Ordinary Paper; and

Mode set: Photo

After allowing the printed paper to stand at 25° C. for 24 h, the print density thereof was measured 5 times at 25° C. using a Macbeth densitometer "RD914" (product number) available from Macbeth Corp., to obtain an average of the measured values.

(2) Gloss [Standard Test (2)]

Solid image printing was carried out on a coated paper (photographic paper <glossy> "KA450PSK (tradename)" having a 60° gloss of 41 available from Epson Corp.) using the above ink-jet printer under the following printing conditions:

Kind of Paper: Photo Printing Paper; and

Mode set: Photo

After allowing the printed paper to stand at 25° C. for 24 h, the 60° gloss thereof was measured 5 times at 25° C. using a glossmeter "HANDY GLOSSMETER" (tradename; product number: PG-1) available from Nippon Denshoku Industries Co., Ltd., to obtain an average of the measured values.

(3) Rubbing Resistance

Solid image printing was carried out on the above coated paper using the above ink-jet printer and dried at 25° C. for 24 h. Then, the printed surface of the paper was strongly rubbed by fingers to evaluate rubbing-off of the printed images according to the following ratings.

Evaluation Ratings

A: Substantially no rubbing-off of printed images, and no contamination of surrounding portions B: Slight rubbing-off of printed images as well as slight contamination of surrounding portions and fingers C: Considerable rubbing-off of printed images, and severe contamination of surrounding portions and fingers (4) Injection Stability Solid image printing was carried out on five ordinary papers using the above ink-jet printer to observe the number of nozzles causing failed injection of ink and evaluate the injection stability according to the following ratings.

Evaluation Ratings

A: No failed injection occurred

B: Failed injection occurred at 1 to 10 nozzles

C: Failed injection occurred at more than 10 nozzles (5) Image Clarity [Standard Test (3)]

Solid image printing was carried out on the above coated paper (photographic paper <glossy>"KA450PSK (tradename)" having a 60° gloss of 41 available from Epson Corp.) using the above ink-jet printer under the following printing conditions:

Kind of Paper: Photo Printing Paper; and

Mode set: Photo

After allowing the printed paper to stand at 25° C. for 24 h, the image clarity (C %) at an incident angle of 45° (comb width: 2.0 mm) was measured 5 times by an image clarity meter "Touch Panel-Type Image Clarity Meter (tradename)" (product number: ICM-IT) available from Suga Testing Machine Co., Ltd., to obtain an average of the measured values.

(6) Image Clarity Property

From the above measured values of the gloss and image clarity, the image clarity property was calculated according to the following formula:

Image Clarity Property=[60° gloss×image clarity (C %)]/100

TABLE 2

|  | Examples | | | Comparative Example |
|---|---|---|---|---|
| Composition of ink | 1 | 2 | 3 | 1 |
| Kind of polymer particles | Production Example 1 | Production Example 1 | Production Example 2 | Comparative Production Example 1 |
| Degree of neutralization (%) | 75 | 75 | 75 | 75 |
| Pigment C.I. No. | PR122 | PV19 | PR122 | PR122 |
| Solid content of water dispersion (wt %) | 8 | 8 | 8 | 8 |
| Glycerol (wt %) | 10 | 10 | 10 | 10 |

TABLE 2-continued

|  | Examples | | | Comparative Example |
|---|---|---|---|---|
| Composition of ink | 1 | 2 | 3 | 1 |
| Triethylene glycol monobutyl ether (wt %) | 7 | 7 | 7 | 7 |
| SURFINOL 465 (wt %) | 1 | 1 | 1 | 1 |
| PROXEL XL2 (wt %) | 0.3 | 0.3 | 0.3 | 0.3 |
| Ion-exchanged water (wt %) | 73.7 | 73.7 | 73.7 | 73.7 |
| Measured items |  |  |  |  |
| Print density | 1.28 | 1.22 | 1.30 | 1.30 |
| Gloss | 83 | 85 | 81 | 60 |
| Rubbing resistance | A | A | A | B |
| Injection stability | A | A | A | A |
| Image clarity | 24.7 | 24.8 | 24.7 | 10.0 |
| Image clarity property | 20.5 | 21.1 | 20.0 | 6.0 |

From the results shown in Table 2, it was confirmed that the inks obtained in the respective Examples all enabled images or characters having a high print density to be printed on the ordinary paper, and images or characters printed on the coated paper exhibited a high gloss, a good image clarity and a high image clarity property. Further, it was confirmed that the inks obtained in the respective Examples were excellent in injection stability, and provided prints having an excellent rubbing resistance.

What is claimed is:

1. A water dispersion for ink-jet printing comprising particles of a water-insoluble graft polymer which contain a colorant, said graft polymer having a main chain which is a polymer chain containing a constitutional unit derived from a salt-forming group-containing monomer (a) and a constitutional unit derived from an aromatic ring-containing (meth)acrylate monomer and represented by the formula (1) (b) in which a weight ratio of the constitutional unit derived from the salt-forming group-containing monomer (a) to the constitutional unit derived from the aromatic ring-containing (meth)acrylate monomer and represented by the formula (1) (b) in the main chain is 1/1 to 1/20

wherein $R^1$ is a hydrogen atom or a methyl group; and $R^2$ is a substituted or unsubstituted aralkyl group having 7 to 22 carbon atoms or a substituted or unsubstituted aryl group having 6 to 22 carbon atoms, and a side chain which is a polymer chain containing a constitutional unit derived from one or more kinds of hydrophobic monomers (c) selected from the group consisting of a styrene-based monomer, a (meth)acrylic ester, and an aromatic ring-containing (meth)acrylate wherein a weight ratio of the main chain to the side chain is 1/1 to 20/1.

2. The water dispersion for ink-jet printing according to claim 1, wherein the constitutional unit derived from the hydrophobic monomer (c) is a constitutional unit derived from a styrene-based monomer.

3. The water dispersion for ink-jet printing according to claim 2, wherein the water-insoluble graft polymer contains 3 to 30% by weight of the constitutional unit derived from the salt-forming group-containing monomer (a), 10 to 80% by weight of the constitutional unit derived from the aromatic ring-containing (meth)acrylate monomer (b), and 5 to 50% by weight of the constitutional unit derived from the styrene-based monomer (c).

4. The water dispersion for ink-jet printing according to claim 1, wherein the colorant is a pigment.

5. A water-based ink for ink-jet printing, comprising the water dispersion as defined in claim 1.

6. An ink-jet recording method comprising forming printed characters or images on a void-type glossy recording medium having a porous ink-accepting layer with a water-based ink comprising:
a water dispersion for ink-jet printing comprising particles of a water-insoluble graft polymer which contain a colorant, said graft polymer having a main chain which is a polymer chain containing a constitutional unit derived from a salt-forming group-containing monomer (a) and a constitutional unit derived from an aromatic ring-containing (meth)acrylate monomer and represented by the formula (1) (b) in which a weight ratio of the constitutional unit derived from the salt-forming group-containing monomer (a) to the constitutional unit derived from the aromatic ring-containing (meth)acrylate monomer and represented by the formula (1) (b) in the main chain is 1/1 to 1/20

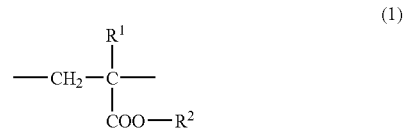

wherein $R^1$ is a hydrogen atom or a methyl group; and $R^2$ is a substituted or unsubstituted aralkyl group having 7 to 22 carbon atoms or a substituted or unsubstituted aryl group having 6 to 22 carbon atoms, and a side chain which is a polymer chain containing a constitutional unit derived from one or more kinds of hydrophobic monomers (c) selected from the group consisting of a styrene-based monomer, a (meth)acrylic ester, and an aromatic ring-containing (meth)acrylate using an ink-jet printer.

7. The water dispersion for ink-jet printing according to claim 1, wherein said aromatic ring-containing (meth)acrylate monomer and represented by the formula (1) (b) is benzyl (meth)acryalte.

* * * * *